| (12) | United States Patent | (10) Patent No.: | US 10,097,381 B2 |
|---|---|---|---|
| | Ziv | (45) Date of Patent: | *Oct. 9, 2018 |

(54) TUNABLE RADIO FREQUENCY (RF) EQUALIZER

(71) Applicant: Corning Optical Communications Wireless Ltd, Aiport City (IL)

(72) Inventor: Roi Yosy Ziv, Ramat Gan (IL)

(73) Assignee: Corning Optical Communication Wireless Ltd, Airport City (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,186

(22) Filed: Jun. 12, 2017

(65) Prior Publication Data

US 2017/0288843 A1   Oct. 5, 2017

Related U.S. Application Data

(63) Continuation of application No. 15/156,533, filed on May 17, 2016, now Pat. No. 9,729,358.

(60) Provisional application No. 62/167,980, filed on May 29, 2015.

(51) Int. Cl.
| H04B 1/10 | (2006.01) |
| H04L 25/03 | (2006.01) |
| H04L 27/01 | (2006.01) |
| H04L 5/14 | (2006.01) |

(52) U.S. Cl.
CPC ........ *H04L 25/03019* (2013.01); *H04L 27/01* (2013.01); *H04L 5/14* (2013.01)

(58) Field of Classification Search
CPC ..... H04L 25/03019; H04L 5/14; H04L 27/01; H03H 19/02; H04W 88/085; H01P 1/2039
USPC ....... 375/219, 220, 222, 350, 229, 346, 295, 375/316; 333/176, 132; 455/562.1
See application file for complete search history.

(56) References Cited

U.S. PATENT DOCUMENTS

| 9,729,358 | B2 * | 8/2017 | Ziv ................... H04L 25/03019 |
| 2006/0152304 | A1 | 7/2006 | Liang et al. |
| 2006/0182072 | A1 * | 8/2006 | Ransome .............. H04W 84/12 370/338 |
| 2008/0058018 | A1 | 3/2008 | Scheinert |
| 2010/0111156 | A1 | 5/2010 | Luo et al. |
| 2013/0335163 | A1 | 12/2013 | Aggarwal et al. |

FOREIGN PATENT DOCUMENTS

| CN | 102185574 A | 9/2011 |
| GB | 2357646 A | 6/2001 |

* cited by examiner

*Primary Examiner* — Phuong Phu

(74) *Attorney, Agent, or Firm* — C. Keith Montgomery

(57) ABSTRACT

A radio frequency (RF) equalizer includes a coupler including an input port, an output port, a coupling port, and an isolation port; a combination circuit including; a coupling node electrically coupled to the coupling port; a first digitally controlled capacitor (DTC) connected between the coupling node and ground; a resistor connected between the coupling node and ground for controlling a quality factor (Q) of resonance of the equalizer; an isolation node coupled to the isolation port; and a second DTC connected between the isolation node and ground. A system and a method of operation are provided.

19 Claims, 12 Drawing Sheets

TUNABLE RADIO FREQUENCY (RF) EQUALIZER

CROSS-REFERENCE TO RELATED APPLICATIONS

This application is a continuation of application Ser. No. 15/156,533, filed May 17, 2016, which claims the benefit of priority under 35 U.S.C. § 119 of U.S. Provisional Application No. 62/167,980 filed May 29, 2015, the content of which is relied upon and incorporated herein by reference in its entirety.

BACKGROUND

The disclosure relates generally to equalizers used for equalizing radio frequency (RF) signals and more particularly to a tunable RF equalizer which may be used in communications equipment such as a distributed antenna system (DAS).

An equalizer is a circuit that attempts to reverse the distortion that a system introduces into a signal as it passes through a communication channel. A variety of communication systems make use of equalizers to improve signal performance. For example, narrow band RF slope equalizers are widely used in various DAS applications to reduce signal distortion.

More specifically, a typical DAS may include complicated designs that require many components. For example, amplifiers, filters, interface units and the like may be included within the DAS. The combinations of components may cause perturbations in the power of a RF signal (which may also be referred to as "ripple" discussed further below). Accordingly, various designs for DASs make use of equalizers to reduce ripple in the RF signals.

There are several topologies for equalizers that are commonly used today. All of the topologies incorporate a frequency resonance close to the band of operation. Generally, the resonance frequency is configured such that if the band of operation requires a negative slope of equalizing, then the resonance frequency of the equalizer is located just above the band of operation frequency range. If the band of operation requires a positive slope of equalizing, then the resonance frequency of the equalizer is located just below the cellular band of operation frequency range.

One example of a prior art equalizer 10 is shown in FIG. 1. This embodiment of the prior art equalizer 10 makes use of a varactor diode as a tunable capacitor. Unfortunately, the prior art equalizer 10 exhibits high temperature variations due to the nature of the varactor diode. Accordingly, this requires calibration and preferably adjustment of output according to temperature through temperature monitoring and additional control. Additionally, a high degree of variation during production of the varactor diode requires calibration, thus adding expensive complications to the design of the prior art equalizer 10. Further, the prior art equalizer 10 exhibits a low degree of linearity (low third-order intercept point, OIP3) due to the nature of the varactor diode. For example, a typical prior art equalizer 10 would exhibit an OIP3 value of about 35-40 dBm, thus practically eliminating use in high power nodes of the DAS.

The foregoing third-order intercept point (OIP3) previously mentioned is one measure for judging the linearity of weakly nonlinear systems and devices, for example receivers, linear amplifiers, and mixers. The OIP3 is based on the idea that device nonlinearity can be modeled using a low-order polynomial, derived by means of Taylor series expansion. The third-order intercept point relates nonlinear products caused by the third-order nonlinear term to the linearly amplified signal, in contrast to the second-order intercept point that uses second-order terms. As indicated, the prior art equalizer 10 exhibits a low degree of linearity (low third-order intercept point, OIP3) due to the nature of the varactor diode.

Of course, other embodiments of prior art equalizers 10 are known. Unfortunately, the other embodiments likewise are constrained and inadequate for various reasons. For example, some other embodiments of prior art equalizers 10 make use of a single digitally tunable capacitor (DTC) instead of a varactor diode. The problems with DTCs are that they exhibit a rather small capacitance tuning range (which can be very problematic when having to correct for both temperature and production) as well as a relatively low self-resonance frequency (SRF) which is caused by a resonance between the DTC maximum capacitance and self-inductance of the DTC. Typically, the SRF of the DTC should be at least 1.5 times the upper edge of the operating equalized band. Otherwise, there will be an uncontrolled notch frequency close to the equalized operating band, making equalizers based upon DTCs useless at high operating frequencies (for example, up about 2 GHz).

What are needed are improved methods and apparatus to provide for equalization of the RF signal in a communication system. The methods and apparatus should provide consistent quality devices that are useful over a wide range of radio frequencies, and stable over an operational temperature range.

No admission is made that any reference cited herein constitutes prior art. Applicant expressly reserves the right to challenge the accuracy and pertinency of any cited documents.

SUMMARY

In one embodiment, a radio frequency (RF) equalizer is provided. The RF equalizer comprises a coupler comprising an input port, an output port, a coupling port, and an isolation port. The RF equalizer also comprises a combination circuit. The combination circuit comprises: a coupling node electrically coupled to the coupling port; a first digitally tunable capacitor (DTC) connected between the coupling node and ground; a resistor connected between the coupling node and ground for controlling a quality factor (Q) of resonance; an isolation node coupled to the isolation port; and a second DTC connected between the isolation node and ground.

In a further embodiment, a method for equalizing a circuit is provided. The method comprises: (a) coupling a first DTC between a coupling port of a coupler and ground; (b) coupling a second DTC between an isolation port of the coupler and ground; (c) determining a frequency response of the circuit in a desired band of operation; (d) setting the first DTC to a predetermined resonance frequency outside the desired band of operation to generate a frequency response for equalizing the frequency response of the circuit in the desired band of operation; and (e) adjusting the second DTC to fine tune the equalizing the frequency response.

In another embodiment, an equalizing system is provided. The equalizing system comprises a distributed antenna system (DAS). The DAS is for receiving at least one service from at least one base station. The DAS comprises a head end unit (HEU) and a plurality of remote antenna units (RU). The plurality of RU is distributed over a deployment site. The HEU is configured for routing the at least one service to the plurality of RU. The equalizing system also comprises a RF equalizer disposed in at least one of the HEU and one of the plurality of RU. The RF equalizer comprises: a coupler comprising an input port, an output port, a coupling port, and an isolation port; a combination circuit comprising a coupling node electrically coupled to the coupling port; a first DTC connected between the coupling node and ground; a resistor connected between the coupling node and ground that controls a quality factor (Q) of resonance; an isolation node coupled to the isolation port; and a second DTC connected between the isolation node and ground.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A focuses on a band of frequencies in which the frequency response is rising. FIG. 3B focuses on a band of frequencies in which the frequency response is falling;

DETAILED DESCRIPTION

Figure 1:
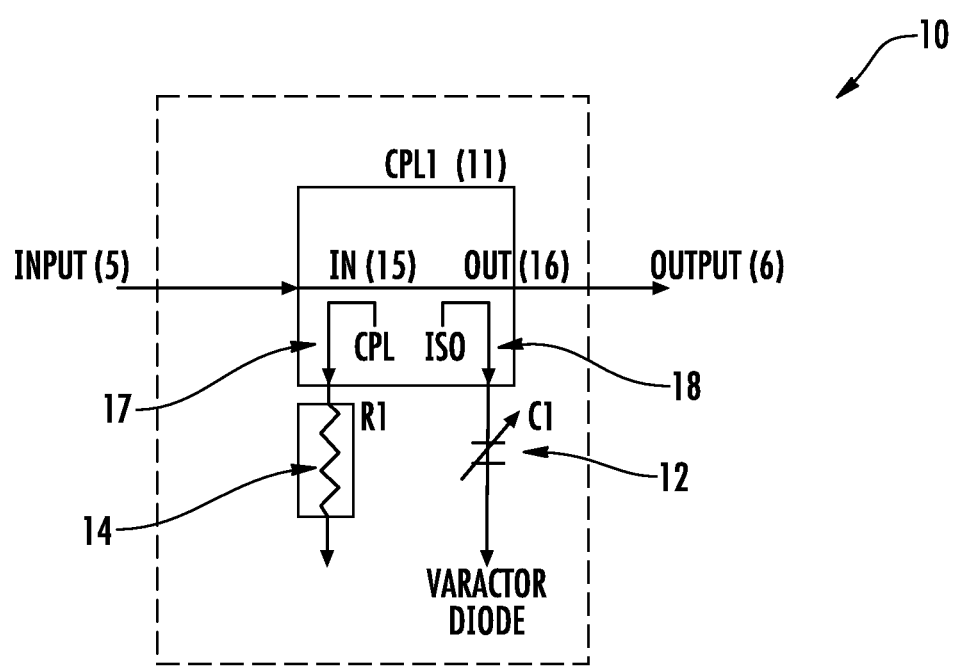
FIG. 1 is an embodiment of a prior art equalizer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the various accompanying figures, can be arranged, substituted, combined, separated, and designed in a wide variety of different configurations, all of which are explicitly contemplated herein.

Disclosed herein is a tunable radio frequency (RF) equalizer. The tunable RF equalizer provides for tuning over a substantial frequency range. The design of the tunable RF equalizer provides for consistently reliable performance between units as well as stable performance over a wide temperature range. Generally, the tunable RF equalizer makes use of two (2) digitally tuned capacitors (DTC) in place of the varactor diode found in the prior art equalizer 10 (FIG. 1). A first one of the DTCs provides for coarse adjustments, a second one of the DTCs provides for fine adjustment. The tunable RF equalizer and other aspects of the tunable RF equalizer are set forth in detail below.

The tunable RF equalizer provides numerous advantages over the prior art equalizer. For example, the tunable RF equalizer exhibits low signal loss (of about 1-2 dB max). The tunable RF equalizer exhibits very good input and output return loss (of about 15 dBm min); has ultra-high linearity (OIP3=65-70 dBm) compared to 35-40 dBm in conventional varactor based equalizers; has low material cost; and is small in size and therefore takes minimal area on a printed circuit board (PCB). For example, the tunable RF equalizer may require only about 10 mm×15 mm. Additionally, the tunable RF equalizer can produce both negative slopes and positive slopes exhibiting resolution of about 0.7 dB with 0.1 dB over an operating band, and can be modified to provide greater performance. Unlike the prior art equalizers 10 (FIG. 10), the tunable RF equalizer of this disclosure generally exhibits a slope variation of only about +/−0.1 dB over a temperature range of about negative thirty (30) degrees Celsius to about eighty (80) degrees Celsius, thus eliminating the need to calibrate or further control the equalizer. Further, it is possible to arrange the tunable RF equalizer in series (provide a "cascade configuration") and thus to achieve additional effects when equalizing signals (for example, to implement a convex shape or "smiley shape" of the equalizer signal superimposed over a ripple instead of a slope shape (tilt)) as described below.

In particular, the tunable RF equalizer provides for enhancement of signals within a communications system. For example, the communications system could be a wireless distribution system, which may be in the form of a distributed antenna system (DAS). Some embodiments and illustrative aspects of DASs suited for making use of the tunable RF equalizer are disclosed herein.

Figure 2A:
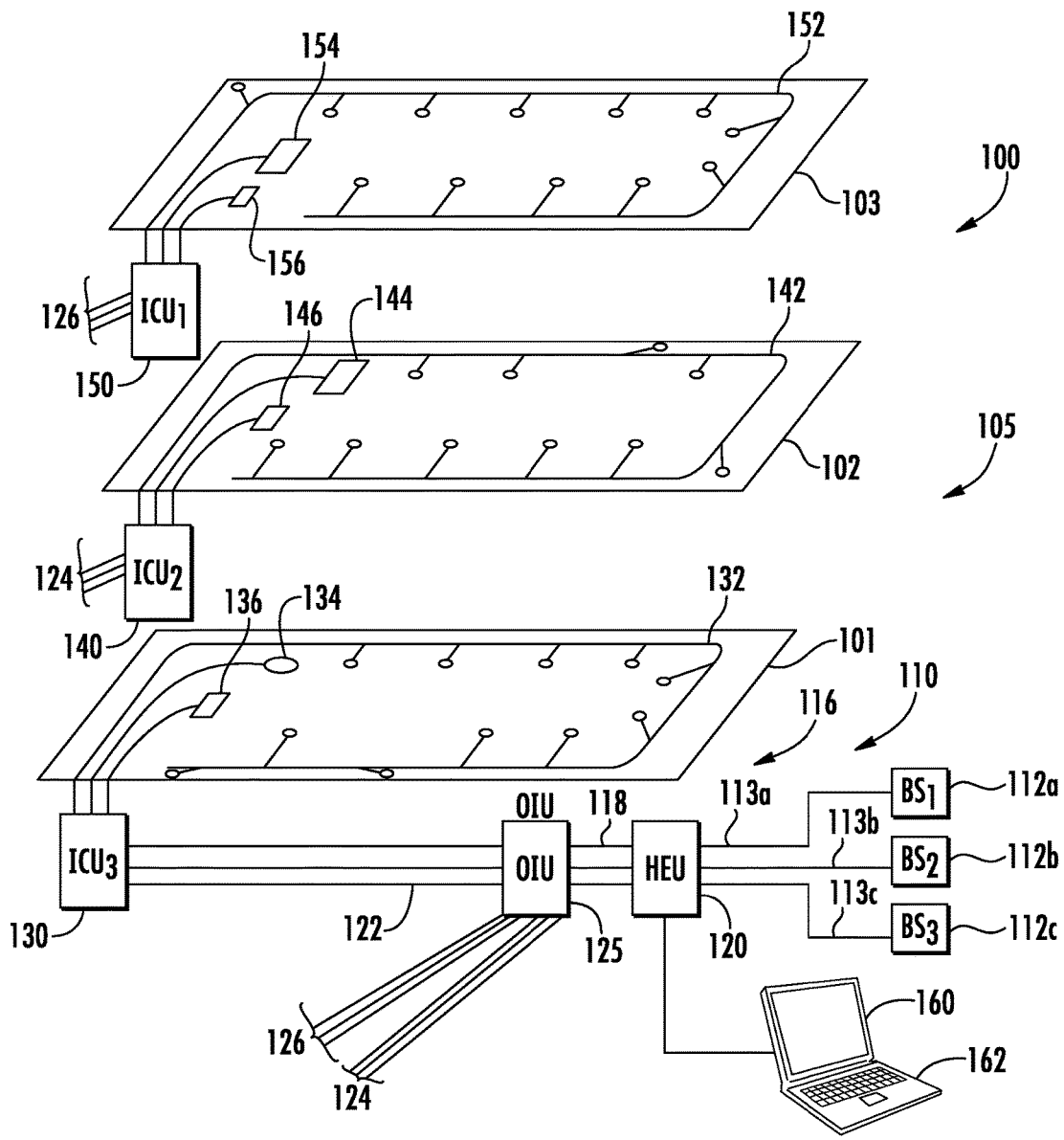
FIGS. 2A and 2B, collectively referred to herein as FIG. 2, are system level diagrams providing an overview of an embodiment of a distributed antenna system (DAS)
Figure 2B:
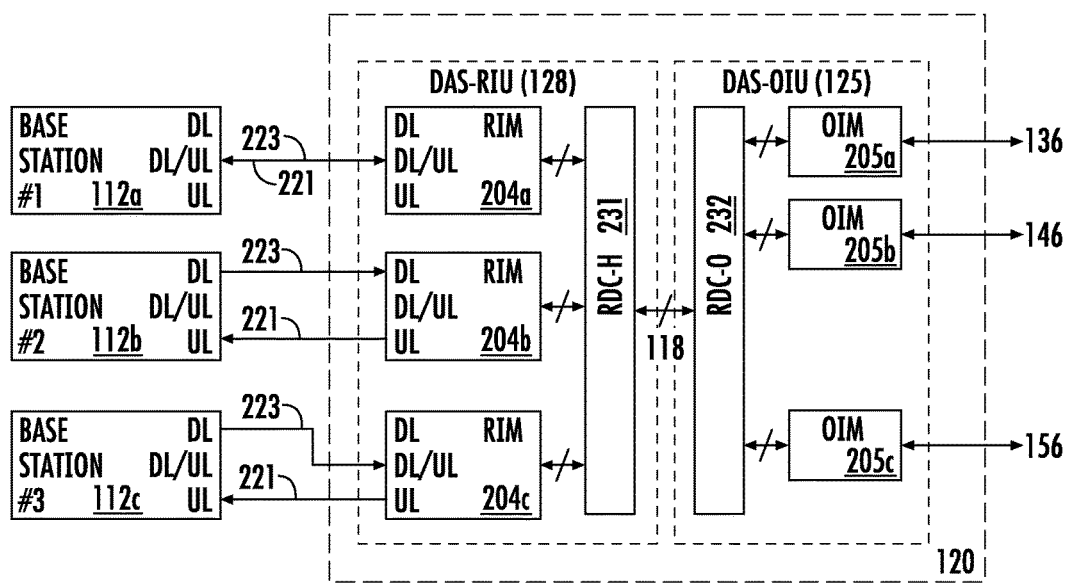

Turning now to the drawings, FIGS. 2A and 2B depict an illustrative non-limiting example of aspects of a wireless distribution system in the form of a DAS 100. A DAS generally refers to an antenna system including a plurality of spatially separated antennas. The DAS 100 may communicate with a variety of commercial communications systems to distribute services to clients within range of the DAS, such as voice and/or data communications services. A client may be cellular phones, smart phones, wireless computers, wireless laptop computers, mobile devices such as tablet computers, pad computers, personal digital assistant, and wireless sensors or networks of sensors, such as mesh network sensors, as non-limiting examples.

The DAS may also make use of electrical signal medium or optical fiber, wired communications cables and any other type of conduit or link deemed appropriate. Communication services may include narrow bands of radio frequency (RF) that are provided over bands of frequencies such as between about 400 MegaHertz (MHz) to 2700 MHz frequency range, and include signal centered about frequencies such as 700 MHz, 850 MHz, 1900 MHz, and 2300 MHz, as examples. A narrow band signal may be a specific band of frequencies within a spectral range. Generally, the narrow band communication signals provide for operation of a communication service that an operator is permitted to transmit under communication guidelines and permissions. Broadband communication signals generally refers to a band of communication signals that is made up of two or more narrow bands of communication signals.

The DAS is merely an exemplary embodiment of a communication system that may take advantage of a tunable RF equalizer. Accordingly, while the tunable RF equalizer is set forth in relation to a DAS, the tunable RF equalizer may be used with a variety of other systems as deemed appropriate. The DAS 100 may support communication services generally including digital data services including but not limited to Ethernet, WLAN, Worldwide Interoperability for Microwave Access (WiMax), Radio over Fiber (RoF), Wireless Fidelity (WiFi), PCS band, 2G, 3G, 4G, GSM, Digital Subscriber Line (DSL), and Long Term Evolution (LTE), etc.

As shown in FIG. 2A, the DAS 100 is implemented on a first floor 101, a second floor 102 and a third floor 103, respectively, of a building 105. In this example, a plurality of communications services 110 are provided, such communications services coming from first, second and third base stations 112a, 112b 112c over cables or a wireless repeater or bidirectional amplifier (BDA) 113a, 113b, 113c respectively. The services are input to a HEU 120 for routing through DAS 100. The HEU 120 may be a chassis that includes a radio interface module (RIM) and/or components that conditions the incoming radio frequency downlink signal from the operator signal source. The HEU 120 tunes the signal to constant power level before the signal is distributed. The DAS 100 is controlled by a computer 160 with operator input device 162. The computer 160 may include local memory and may have access to remote memory, as well as computer programs stored on at least one non-transitory medium, either locally or remotely. The computer 160 may be connected directly to the HEU 120 and may be in control of other elements of the DAS 100 via wired connections or remotely, as shown. The computer 160 may also control an optical interface unit (OIU) 125, which in turn may be coupled to optical fiber 122, 124 and 126.

The communication services 110 may be routed through the DAS 100. Cable or hard wire outputs 118 from the HEU 120 may connect to the OIU 125, if the DAS 100 is an optical-fiber based DAS, and then to interconnect units 130, 140, 150 through the respective optical fiber 122, 124 and 126 for serving the first floor 101, second floor 102, and third floor 103 of building 105. Interconnect units 130, 140, 150 provide mechanical interfaces and power to the cable outputs from the interconnect units. The OIU 125 may include a plurality of RDCs and a switching matrix for transmitting a broadband electrical signal from the HEU 120 to a destination. The OIU 125 may also be configured to receive a plurality of broadband electrical signals from the plurality of OIUs 125 and transmits them in the opposite direction, such as to the HEU 120, thus allowing for two-way communications. The computer 160 may be used to control the HEU 120, the OIU 125, and the interconnect units 130, 140, 150 of the DAS 100. The computer 160 may also control or monitor switches and switch matrices of the HEU 120 and OIU 125 useful in operation of DAS 100. The computer 160 may be supplied with memory that includes machine executable instructions stored thereon, such as a computer program useful for routing the signals through the DAS 100. The memory may be referred to as "non-transitory" memory.

Within each of first floor 101, second floor 102, and third floor 103, services are provided separately, as shown. Thus, the first floor 101 may be provided, through interconnect unit 130, with an Ethernet wire distribution 132, a Wi-Fi hot spot 134, and a remote antenna unit (RAU) 136. In this example, similar services may be provided to the second floor 102 and third floor 103, through respective interconnect units 140, 150 with Ethernet lines 142, 152, Wi-Fi hot spots 144, 154 and RAUs 146, 156.

In the illustrative embodiments described herein, the DAS includes a central base station and a plurality of RU, which may be remote antenna units. A remote antenna unit is a device that converts and filters a broadband signal into a narrow electrical signal and vice versa. The base station as well as the RUs may make use of electrical and/or optical technologies that are interfaced with wireless systems (as well as wired systems upstream of the DAS).

Shown with more detail in FIG. 2B, the HEU 120 includes a radio interface unit (RIU) 128. The RIU 128 includes a plurality of radio interface modules (RIM) 204a, 204b, 204c (generally referred to hereafter as "RIM 204"). Each RIM 204 receives signals from a respective base station 112a, 112b, 112c (generally referred to hereafter as "base stations 112") and passes signals to first combiner/splitter 231. The first combiner/splitter 231 communicates signals via wire outputs 118 to OIU 125. A second combiner/splitter 232 communicates signals to optical interface modules (OIM) 205a, 205b, 205c (generally referred to hereafter as "OIM 205"). Each OIM 205 communicates signals to RAUs 136, 146, 156 in a manner as provided with regard to FIG. 2A.

Each RIM 204a, 204b, 204c may include two equalizers of this disclosure, one for a downlink (DL) path 223 and one for an uplink (UL) path 221. A great variety of configurations may be used to equalize signals.

Figure 3A:
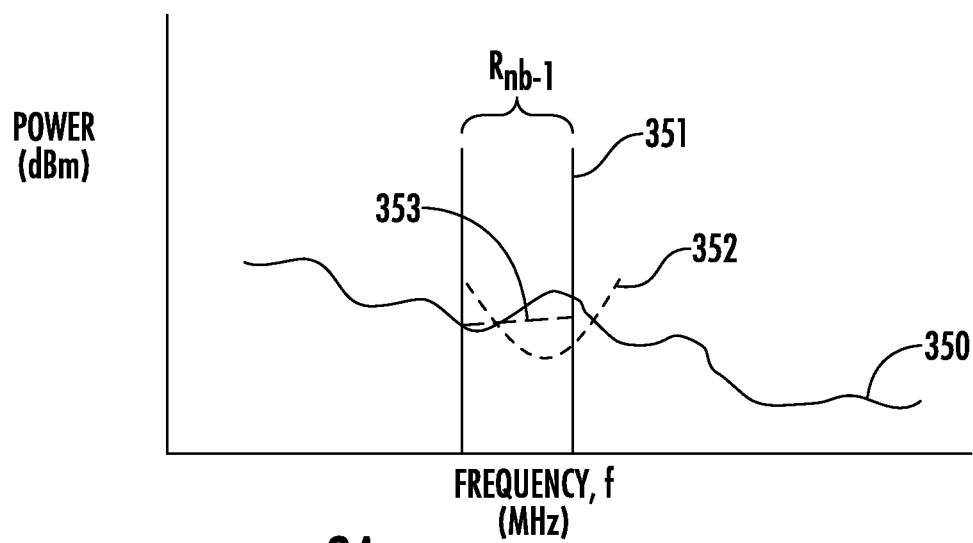
FIGS. 3A and 3B, collectively referred to herein as FIG. 3, are graphs depicting the frequency response of a signal over a range of frequencies.
Figure 3B:
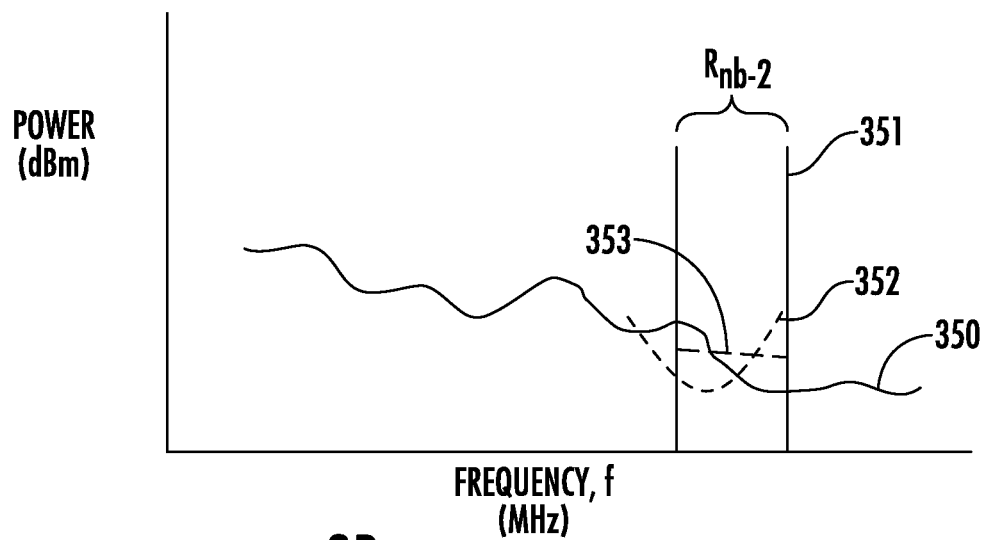

The structure and function of the equalizer of this disclosure is described below. Before turning to that discussion, it is helpful to understand what the equalizer of this disclosure does. FIGS. 3A and 3B are graphs depicting the frequency response of a signal over a range of frequencies. FIG. 3A focuses on a band of frequencies in which the frequency response is rising. FIG. 3B focuses on a band of frequencies in which the frequency response is falling. Each narrow band of frequencies generally includes a plurality of individual frequencies, or sub-groupings of frequencies, and that each narrow band of frequencies may be centered about a frequency that lies in the center of the band.

FIGS. 3A and 3B depict the same broadband of radio frequencies 350. Broadband of radio frequencies 350 includes a number of narrow bands of radio frequencies 351. Two narrow bands of radio frequencies 351—namely, a first narrow band of radio frequencies, $R_{nb-1}$, and a second narrow band of radio frequencies, $R_{nb-2}$ are illustrated for purposes of this discussion.

FIG. 3A depicts a positive slope ripple over the first narrow band of radio frequencies, $R_{nb-1}$, while FIG. 3B depicts a negative slope ripple over the second narrow band of radio frequencies, $R_{nb-2}$. A signal generated by the equalizer of this disclosure and depicted as equalizer signal 352 is superimposed over the ripple in each of narrow band of radio frequencies 351, as shown in FIG. 3A and FIG. 3B. As a result, an equalized signal 353 is achieved over each narrow band of radio frequencies 351. The equalized signal 353 is substantially smooth and flat across each respective narrow band of radio frequencies 351, and therefore may be processed more reliably.

Referring back to FIG. 1, the topology for the prior art equalizer 10 includes a coupler 11 (CPL1). The coupler 11 includes a coupler input port 15 and a coupler output port 16. The coupler input port 15 is connected to an equalizer input 5. The coupler output port 16 is connected to an equalizer output 6. A coupler with a low coupling coefficient will result in a large equalizing range in terms of power and a coupler with a high coupling coefficient will result in a small equalizing range. The isolated port 18 of coupler 11 is connected to a tunable capacitor 12 which is implemented by a varactor diode. Capacitance of the varactor diode is controlled by varying the bias voltage. In general, the inductance of the coupler 11 will resonate with capacitance of the tunable capacitor 12, and thus create a sharp notch filter (band stop filter) at a frequency close to the band of operation (that is, the appropriate narrow band of frequencies).

Resistor 14 is coupled to coupling port 17 of the coupler 11. Resistor 14 provides for control of a quality factor (Q) for the frequency resonance. Resistor 14 will therefore control the resonance notch amplitude in such way that a lower value resistance will reduce the amount of the equalizer correction in a given frequency range and a higher value resistance will enlarge the amount of the equalizer correction.

As mentioned above, variability in the quality of varactor diodes results in a number of unfavorable properties, and thus calibration is required. For example, calibration is needed to overcome varying performance as a result of temperature changes, and the inherent performance differences between varactor diode components that generally result from variations during production. These problems and others are overcome by a tunable RF equalizer as disclosed in FIG. 4.

Figure 4:
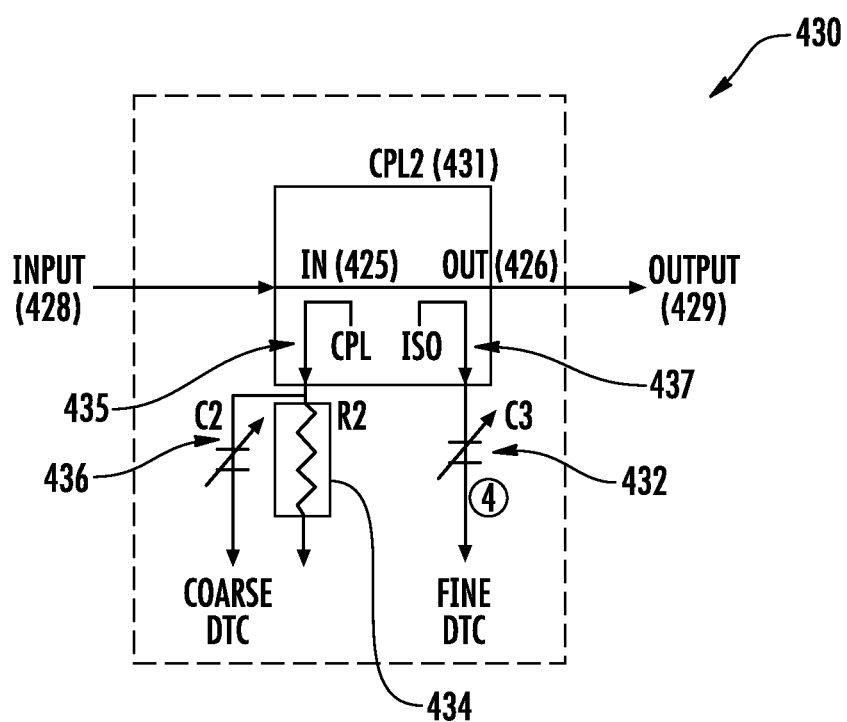
FIG. 4 is an exemplary embodiment of a tunable radio frequency (RF) equalizer according to embodiments disclosed herein.

With respect to FIG. 4, an illustrative embodiment of a tunable RF equalizer 430 is shown. In this example, tunable RF equalizer 430 has been configured for operation over a band of frequencies that ranges between about 1930 MHz to about 2000 MHz.

The tunable RF equalizer 430 includes a coupler 431. The coupler 431 includes an input port 425 and an output port 426. The input port 425 is coupled to an equalizer input 428. The output port 426 is coupled to an equalizer output 429. A coupler with a low coupling coefficient will result in a large equalizing range and the coupler with a high coupling coefficient will result in a small equalizing range.

Isolated port 437 of the coupler 431 is connected to a fine tunable capacitor 432. The fine tunable capacitor 432 is implemented by a digitally tunable capacitor (DTC), where the tunable capacitance is controlled by a digital SPI bus which is controlled by a central processing unit (CPU, not shown). As provided herein, the term "digitally controllable capacitor" may be considered as synonymous with "digitally tunable capacitor." In general, inductance of the coupler 431 will resonate with capacitance of the fine tunable capacitor 432 to create a sharp notch filter (band stop filter) at a frequency close to the band of operation. Similarly, a coupling port 435 of the coupler 431 is connected to a coarse tunable capacitor 436. The coarse tunable capacitor 436 is implemented by another DTC. In general, inductance of the coupler 431 will resonate with capacitance of the coarse tunable capacitor 436 to create a sharp notch filter (band stop filter) at a frequency close to the band of operation.

Each DTC has an inherent resonance frequency and the operation must be kept below the inherent self-resonance frequency (SRF). Generally, a margin should be applied to avoid the SRF. For example, if the SRF is 3 GHz, then the DTC should be operated at no more than 2 GHz. Accordingly, by using two DTCs in parallel as disclosed herein, a greater capacitance is made available to the tunable RF equalizer 430. The greater capacitance may be made available to the system and used to tune the resonance of the equalizer circuit.

Resistor 434 is connected to the coupling port 435 of the coupler 431. Resistor 434 provides for control of a quality factor (Q) of the frequency resonance. Resistor 434 will therefore control the resonance notch amplitude in such way that a lower value resistance will reduce the amount of the equalizer correction in a given frequency range and a higher value resistance will enlarge the amount of the equalizer correction.

In this illustrative embodiment, the coarse tunable capacitor 436 is a DTC with thirty-two (32) steps (that is, a five (5) bit DTC). The coarse tunable capacitor 436 exhibits capacitance ranging from about 0.9 picoFarad (pF) to about 4.6 pF in a step size of 119 pF.

In this illustrative embodiment, the fine tunable capacitor 432 is also a DTC with thirty-two (32) steps (that is, a five (5) bit DTC). The fine tunable capacitor 432 exhibits capacitance ranging from about 0.85 pF to about 2.4 pF in a step size of 50 pF.

The tunable RF equalizer 430 advantageously controls the resonance notch amplitude by, among other things, using two DTCs. By implementing the coarse tunable capacitor 436 of the coupling port 435, and the fine tunable capacitor 432 of the isolated port 437, the problems arising in the prior art regarding overall SRF are largely avoided. That is, the isolation between the coupling port 435 and the isolated port 437 (due to λ/4 transmission line inherent in the coupler 431) isolates the coarse tunable capacitor 436 from the fine tunable capacitor 432. Therefore the overall SRF from both tunable capacitors (432, 436) is higher than in a design using a single DTC on the isolated port 437, and includes the sum of the capacitances available in the fine tunable capacitor 432 and the coarse tunable capacitor 436. The isolation allows each DTC to be used to control the resonance notch frequency of the equalizer signal. Through the configuration of the capacitance of coarse tunable capacitor 436 on the coupler port 435 and the capacitance of fine tunable capacitor 432 on the isolated port 437, the capacitance of coarse tunable capacitor 436 has been found to provide good coarse tuning of the resonance notch and the capacitance of fine tunable capacitor 432 has been found to provide good further fine tuning of this resonance notch. Together, the two DTCs of this disclosure may be used to provide more controlled shaping of an equalization signal to improve equalization of ripples on a service signal.

Figure 5:
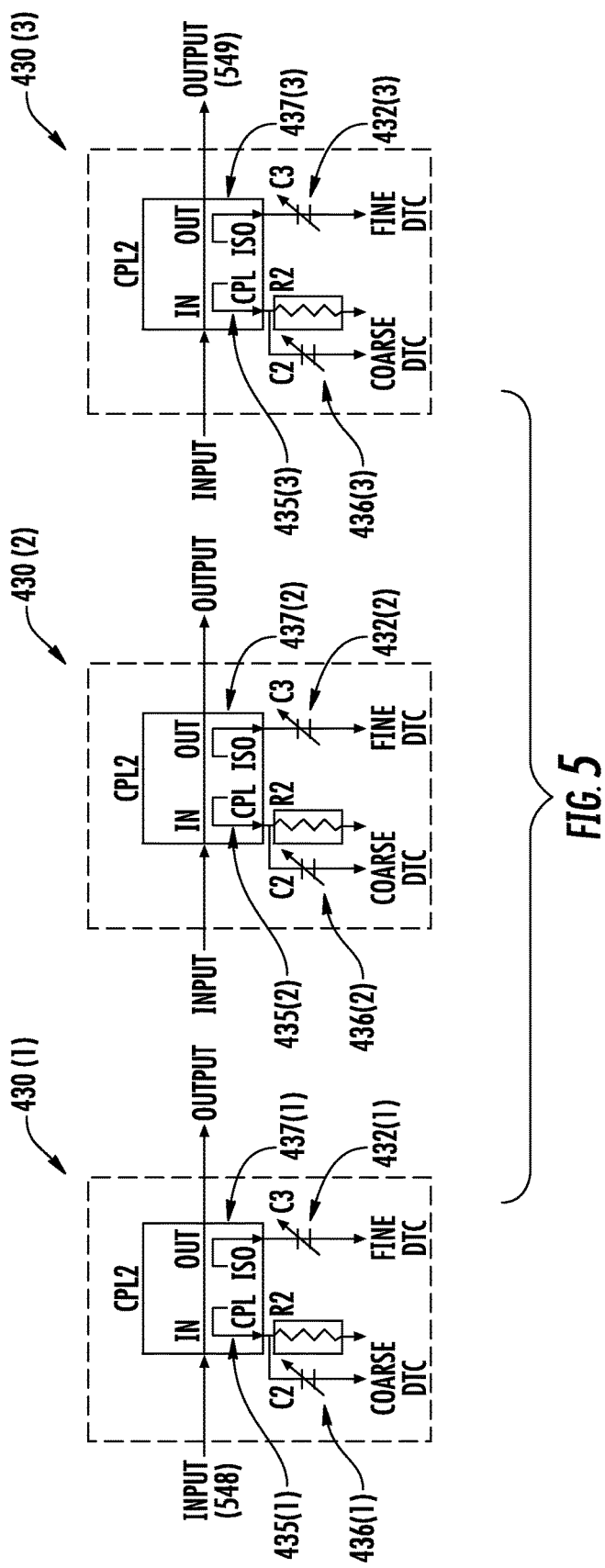
FIG. 5 is an example of a cascade configuration for the tunable RF equalizer of FIG. 4.

FIG. 5 depicts a cascade configuration where multiple instances of the tunable RF equalizer 430 are implemented. In this example, a first tunable RF equalizer 430(1) is configured to receive an input signal 548. The first tunable RF equalizer 430(1) provides output to an input of a second tunable RF equalizer 430(2). The second tunable RF equalizer 430(2) provides output to an input of a third tunable RF equalizer 430(3). The third tunable RF equalizer 430(3) provides output 549 to the communications system (not shown). By cascading the equalizer of this disclosure, it is possible to achieve further tuning of the equalization signal to further improve equalization of ripples on a service signal. The isolation between each of the respective coupling ports 435(1)-435(3) and the isolated ports 437(1)-437(3) of each of the tunable RF equalizers 430(1)-430(3) isolates each of the respective coarse tunable capacitors 436(1)-436(3) from the respective fine tunable capacitors 432(1)-432(3). Therefore the overall SRF from each of the tunable capacitors (432, 436) is higher than in a design using a single DTC on the isolated port 437, and includes the sum of the capacitances available in the fine tunable capacitor 432 and the coarse tunable capacitor 436 in each of the tunable RF equalizers 430-1, 430-2, and 430-3.

Figure 6A:
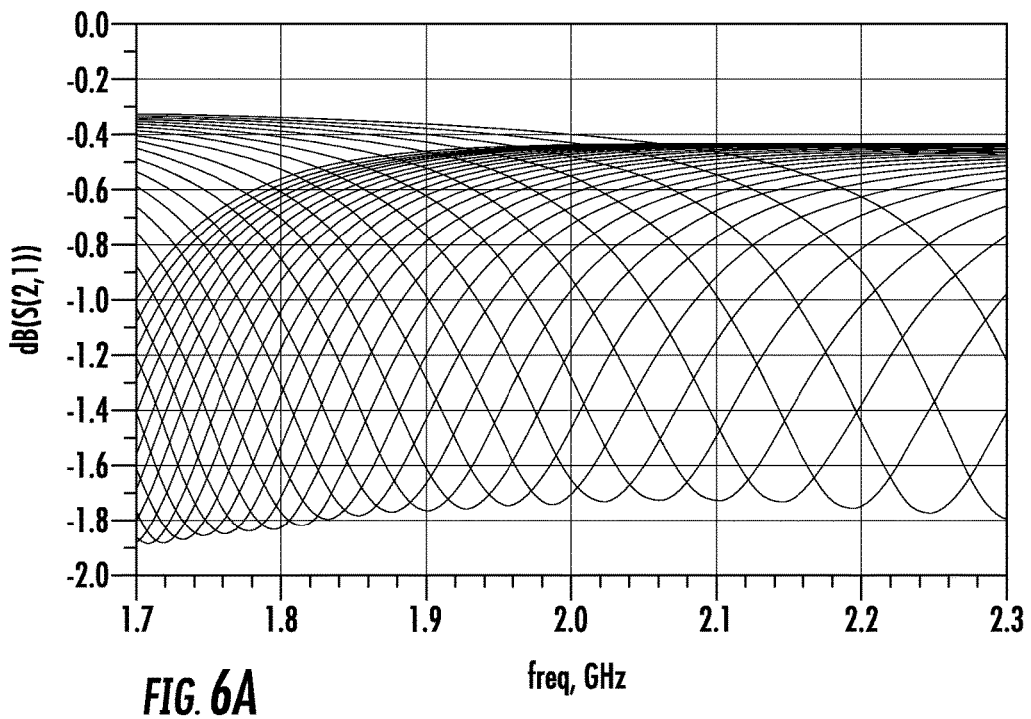
FIGS. 6A and 6B, collectively referred to herein as FIG. 6, are graphs depicting the frequency domain response of a signal due to coarse adjustments made by the tunable RF equalizer of this disclosure.
Figure 6B:
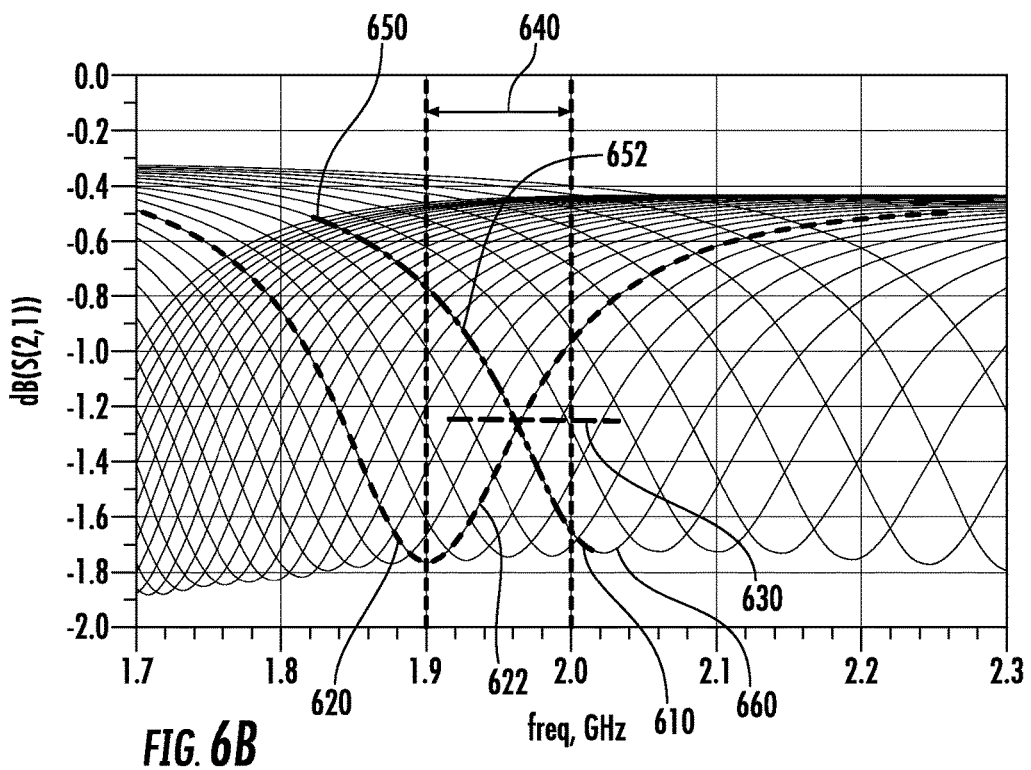

FIGS. 6A and 6B are graphs depicting the frequency domain response of a signal due to coarse adjustments made by the tunable RF equalizer 430 of FIG. 4. The results shown in FIGS. 6A and 6B are for an embodiment of the tunable RF equalizer 430 where the capacitance of the fine tunable capacitor 432 is set and held constant at a capacitive state of 8 (out of 31 capacitive states or values to which the fine tunable capacitor 432 may be set using the DTC of this disclosure), and the capacitive state of the coarse tunable capacitor 436 is swept from the 0 to 31 capacitive states that are available in the illustrative coarse tunable capacitor 436. The capacitive state of the coarse tunable capacitor 436 is illustratively 32 incremental capacitances between about 0.9 pF to about 4.6 pF in a step size of 119 pF. The capacitive state of the fine tunable capacitor 432 is illustratively 32 incremental capacitances between about 0.85 pF to about 2.4 pF in a step size of 50 pF. Hence, the capacitive state of 8 (out of the 31 capacitive states for the fine tunable capacitor 432) would be about 1.25 pF. The setting of each of the fine tunable capacitor 432 and the coarse tunable capacitor 436 is by a digital Serial Peripheral Interface (SPI) bus. The SPI bus is a synchronous serial communication interface specification used for short distance communication, primarily in embedded systems. SPI devices communicate in full duplex mode using a master-slave architecture with a single master. The master device originates the frame for reading and writing. Multiple slave devices are supported through selection with individual slave select (SS) lines. The SPI bus may be referred to as a four-wire serial bus, contrasting with three-, two-, and one-wire serial buses. The SPI may be accurately described as a synchronous serial interface.

While the foregoing describes an illustrative range of capacitance values for both the coarse tunable capacitor 436 and the fine tunable capacitor 432, it will be appreciated that the specific capacitive values, the number of states or capacitances that may be applied to the coarse tunable capacitor 436 and the fine tunable capacitor 432, and the increments between states or capacitances is a design choice.

FIG. 6B illustrates generally how the equalizer of this disclosure operates and greater details of this operation are discussed later below. FIG. 6B shows a narrow band 640 of operating frequencies in a DAS. Within the band, the frequency response of the signal is seen to have a positive slope 622 due to the ripple effect of the DAS components on the signal. Also appearing in FIG. 6B is the sweep of frequencies shown in FIG. 6A generated by the equalizer of this disclosure in the manner described in connection with FIG. 6A above. In order to equalize the positive slope 622 of the service signal 620, an ideal signal from the equalizer of this disclosure may be signal 650. This is because from the sweep of coarse tunable filter settings, it appears that equalizer signal 650 has a negative slope 652 that complements the positive slope 622 of the service signal. From the discussion in connection with FIG. 6A, to generate this signal, the fine tunable capacitor has been set to 1.25 pF. In addition, since equalizer signal 650 is about the $17^{th}$ signal depicted in FIG. 6B (when counting from the left), we know that the coarse tunable capacitor of this disclosure has been set to the $17^{th}$ capacitive state (out of the 31 capacitive states for the coarse tunable capacitor)—namely, about 2 pF. Hence, by setting the coarse tunable capacitor of the equalizer of this disclosure to 2 pF and the fine tunable capacitor to 1.25 pF, the equalizer signal 650 may be generated which when superimposed onto service signal 620 produces an equalized signal 630 across the narrow bandwidth 640 of operation.

More generally, to create the negative slope, the notch 660 is placed above the operating band of the system circuit such that the negative side of the frequency response of the equalizer circuit overlays the positive slope of the operating frequency range of the system circuit. In this way, the negative slope of the tunable RF equalizer 430 cancels the positive slope exhibited by the frequency response of the system circuit to provide a good flat-line response with minimum ripple. To create a positive slope, the notch 660 would be placed below the operating band of the system circuit such that the positive slope of the frequency response overlays the negative slope of the operating frequency of the system circuit. In this way, the positive slope of the RF equalizer cancels the negative slope exhibited by the frequency response of the system circuit to provide a good flat-line response with minimum ripple.

As previously explained, the two DTCs advantageously provide two separate controls for tuning the resonance frequency of the RF equalizer. That is, the coarse tunable capacitor 436 may be adjusted to set the location of the "resonance" notch to create the positive or negative slope required for equalization. The fine tunable capacitor 432 may be adjusted to fine tune the shape of that notch.

Figure 7:
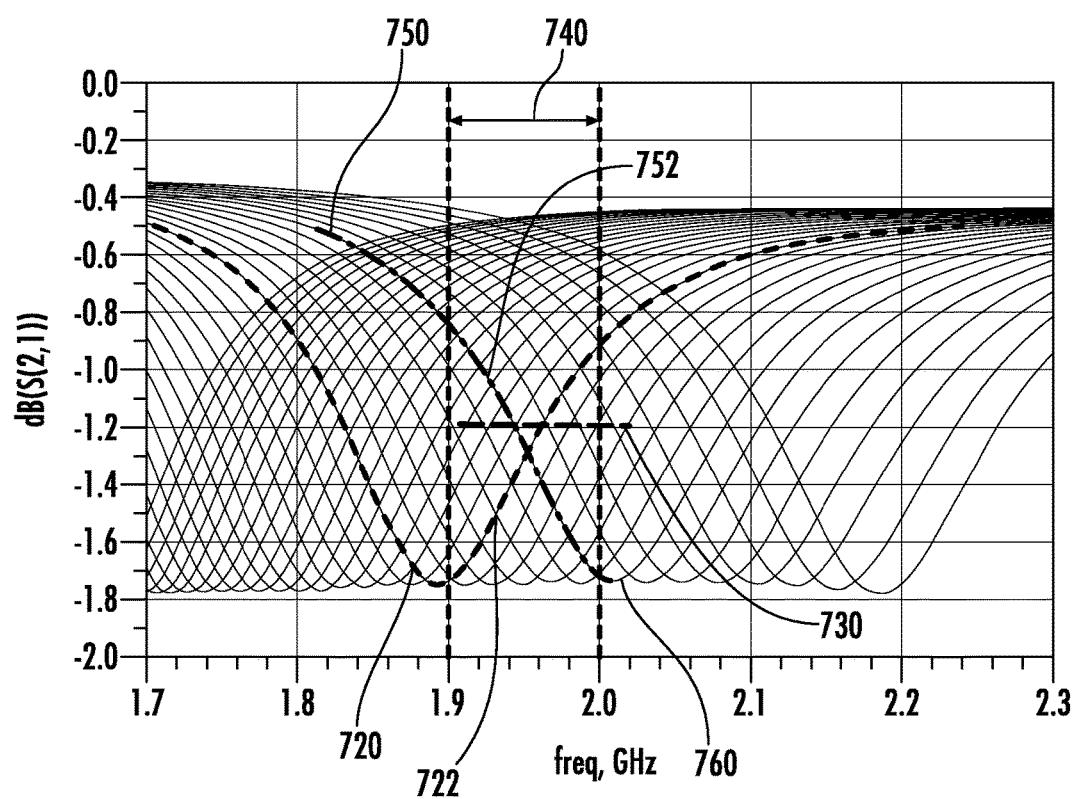
FIG. 7 is a graph depicting the frequency domain response of a signal due to fine adjustments made by the tunable RF equalizer in FIG. 4.

FIG. 7 is a graph depicting the frequency domain response of a signal due to fine adjustments made by the tunable RF equalizer 430 in FIG. 4. The results shown in FIG. 7 are for an embodiment of the tunable RF equalizer 430 where the coarse tunable capacitor 436 is held constant by a digital SPI bus at state of 8 (out of 31 steps), and state of the fine tunable capacitor 432 is swept from 0 to 31.

Similar to FIGS. 6A and 6B, FIG. 7 shows a narrow bandwidth 740 of operating frequencies in a DAS. Within the band, the frequency response of the signal is seen to have a positive slope 722 due to the ripple effect of the DAS components on the signal. As shown in FIG. 7 is the sweep of frequencies generated by the tunable RF equalizer 430 in FIG. 4 as an example. In order to equalize the positive slope 722 of the service signal 720, an ideal signal from the tunable RF equalizer 430 may be signal 750. This is because from the sweep of coarse tunable filter settings, it appears that equalizer signal 750 has a negative slope 752 that complements the positive slope 722 of the service signal 720. As provided above, to generate this signal in this example, the fine tunable capacitor 432 of the tunable RF equalizer 430 in FIG. 4 has been set to 1.85 pF. Thus, the equalizer signal 750 is set to about 2.56 pF in order to maintain notch 760 just above the operating band of the system circuit. That is, in the manner described in relation to FIGS. 6A and 6B, by setting the fine tunable capacitor of the RF equalizer of this disclosure to 1.85 pF and the coarse tunable capacitor to 0.715 pF, the equalizer signal 750 may be generated which when superimposed onto service signal 720 produces an equalized signal 730 across the narrow bandwidth 740 of operation.

As can be seen at FIG. 6B, the coarse tunable capacitor 436 gives a wider frequency range about the notch center frequency with low resolution. As can be seen in FIG. 7, the fine tunable capacitor 432 gives a more narrow frequency range about the notch center frequency range with high resolution. When both the coarse tunable capacitor 436 and the fine tunable capacitor 432 are combined together in the tunable RF equalizer 430, both high range and high resolution (of +/−0.1 dB steps) are achieved. This high resolution helps achieve finer equalizing slopes and reduce the overall ripple in the radio frequency chain.

Figure 8:
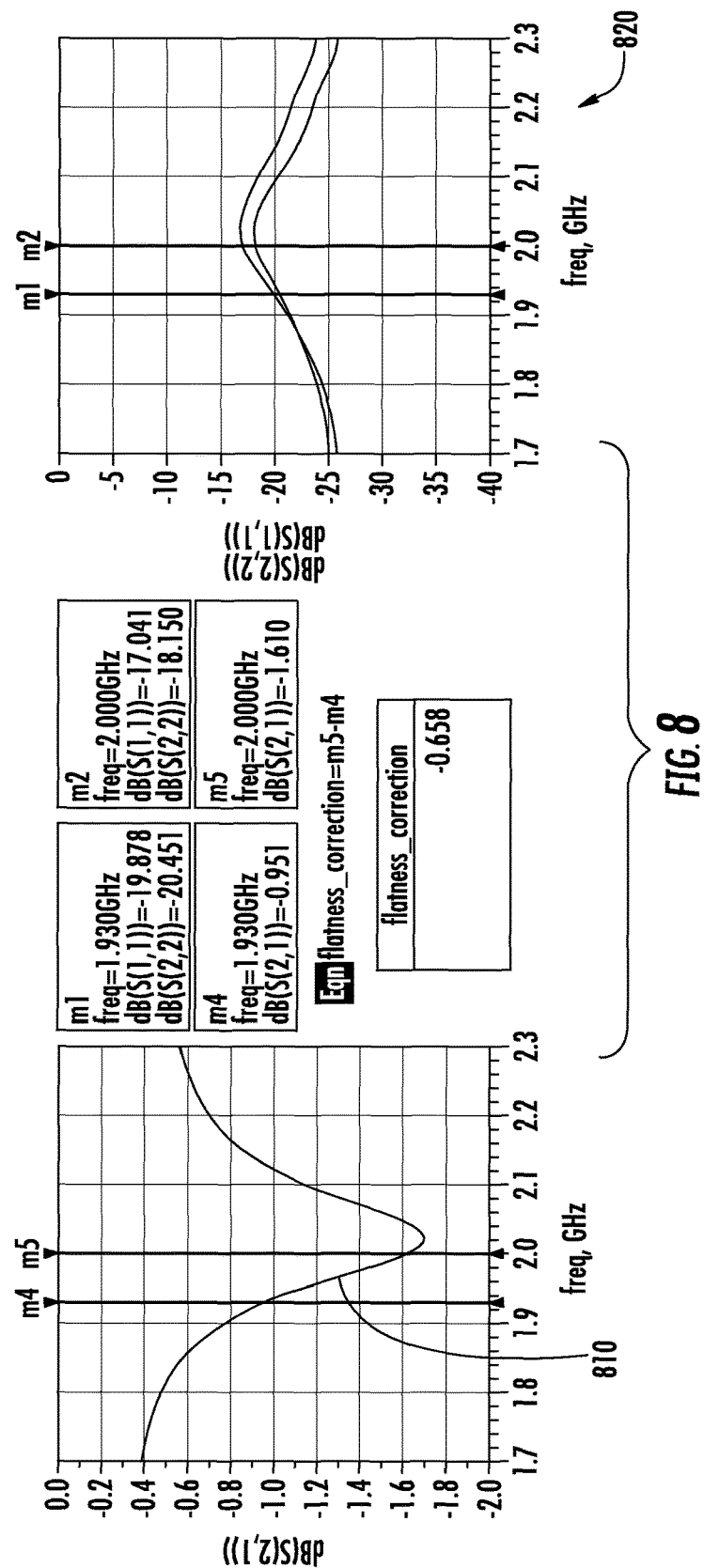
FIG. 8 includes two graphs depicting the frequency domain response of a signal due to tuning of the RF equalizer to provide a negative slope correction.
Figure 9:
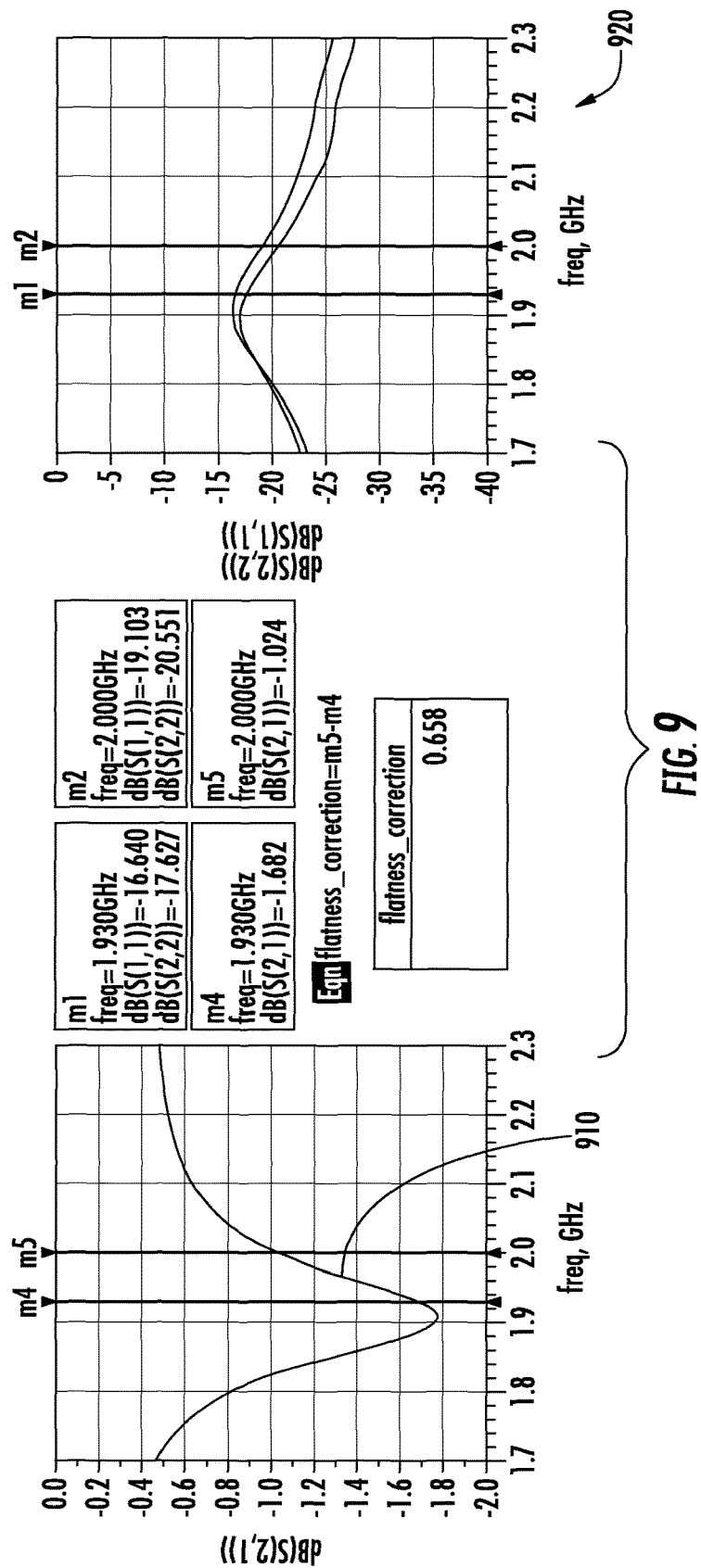
FIG. 9 includes two graphs depicting the frequency domain response of a signal due to tuning of the equalizer to provide positive slope correction.

FIGS. 8 and 9 depict two graphs depicting the frequency domain response of a signal due to tuning of the equalizer to provide negative and positive slope correction, respectively using the tunable RF equalizer 430. In FIG. 8, results are provided for a negative slope 810 correction mode. In other words, the tunable capacitors are set so that the RF equalizer of this disclosure generates a negative slope. In FIG. 9, results are provided for a positive slope 910 correction mode. In other words, the tunable capacitors are set so that the equalizer of this disclosure generates a positive slope. As shown in graphs 820 and 920 in FIGS. 8 and 9, respectively, the results show very low insertion loss (less than 2 dB) along with very good return loss (better than 15 dB). Unlike many prior art equalizers that have low return loss (lower than 10 dB) and require attenuator pads (rated at about 2 dB) on each side in order to improve performance (with the attendant expense of insertion loss), the tunable RF equalizer 430 does not require attenuator pads and the insertion loss is kept low.

Figure 10:
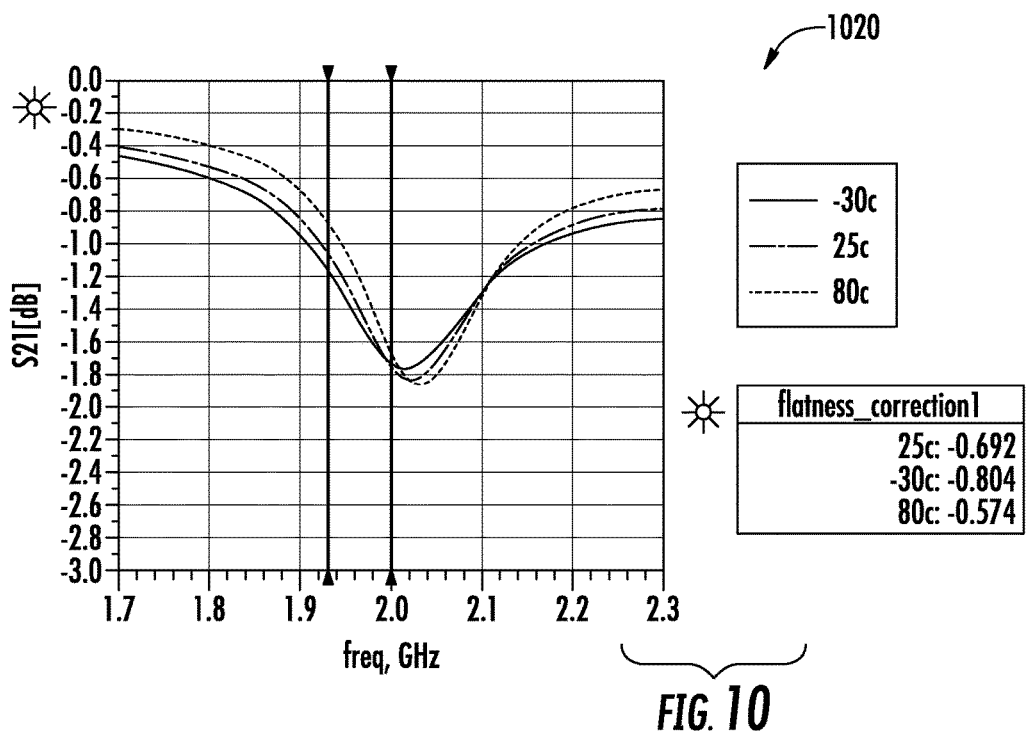
FIG. 10 includes a graph depicting the frequency domain response of a signal due to tuning of the equalizer for negative slope correction as a function of temperature.
Figure 11:
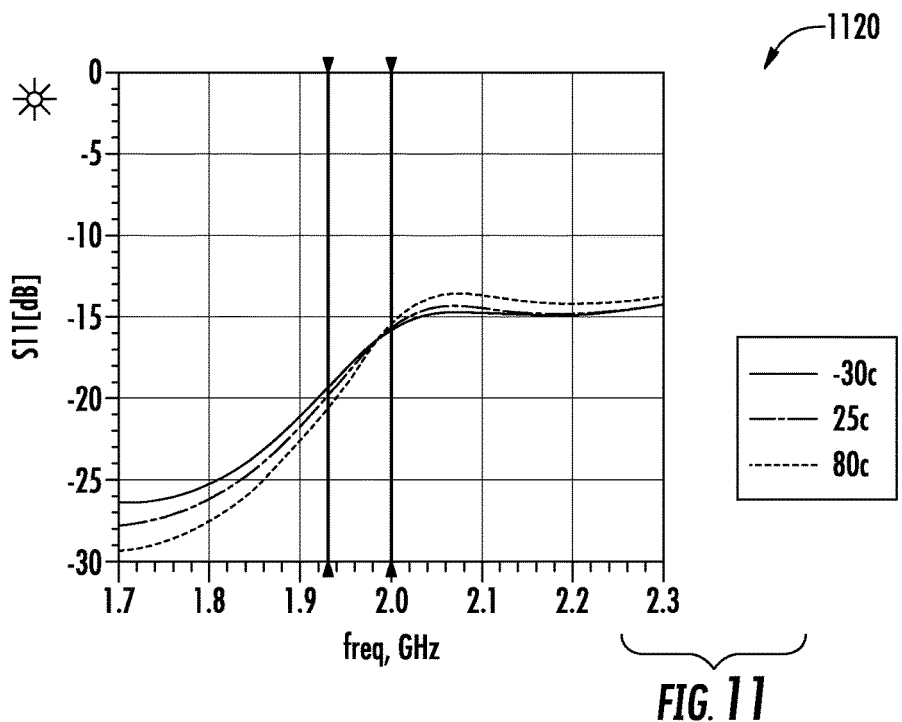
FIG. 11 is a graph depicting the frequency domain response of the input return loss due to the tuning of the equalizer for negative slope correction as a function of temperature.
Figure 12:
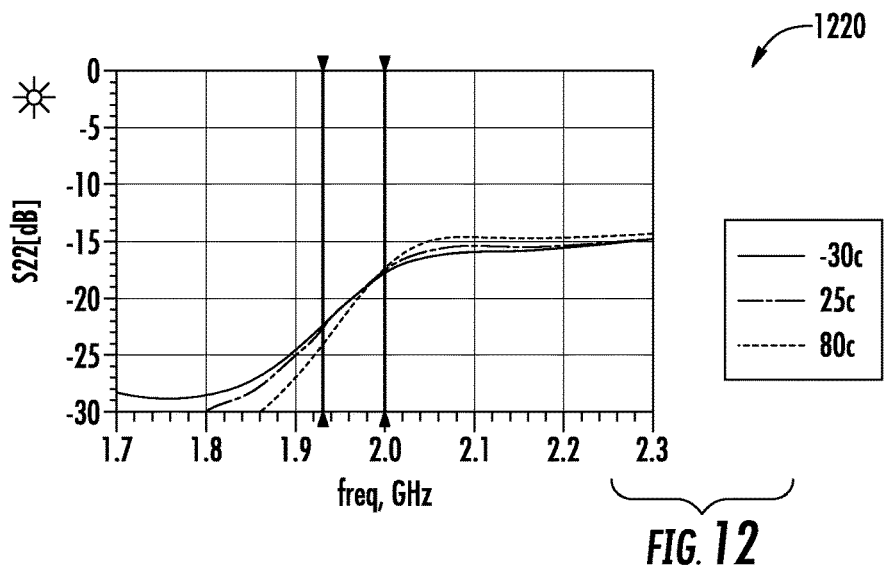
FIG. 12 is a graph depicting the frequency domain response of output return loss due to the tuning of the equalizer for negative slope correction as a function of temperature.

FIGS. 10-12 depict test results for the tunable RF equalizer 430 in FIG. 4 when applying a negative slope correction as an example. Specifically, FIG. 10 includes a graph 1020 depicting the frequency domain response of a signal due to tuning of the equalizer for negative slope correction as a function of temperature. FIG. 11 is a graph 1120 depicting the frequency domain response of the input return loss due to the tuning of the equalizer for negative slope correction as a function of temperature. FIG. 12 is a graph 1220 depicting the frequency domain response of output return loss due to the tuning of the equalizer for negative slope correction as a function of temperature.

In each one of FIGS. 10-12, performance was measured at temperatures of negative 30 degrees Centigrade, 25 degrees Centigrade, and 80 degrees Centigrade. As shown, return loss variation is less than +/−1 dB over the entire temperature range. The insertion loss variation is less than +/−0.1 dB and the slope variation is plus or minus about 0.1 dB over the entire temperature range. Unlike the prior art equalizer 10 (see FIG. 1) that require software control to account for temperature performance variations, the tunable RF equalizer 430 does not require additional software control, thus making the design phase much easier and mass production of the tunable RF equalizer 430 much more repeatable and robust.

Figure 13:
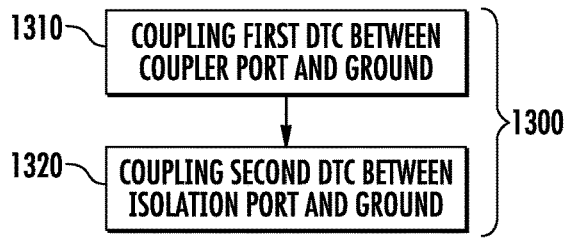
FIG. 13 is a flow chart providing an exemplary method for manufacturing a tunable RF equalizer.

FIG. 13 is a flowchart that provides an exemplary method 1300 for manufacturing the tunable RF capacitor 430. The exemplary method 1300 for manufacturing tunable RF capacitor 430 begins with a first step 1310. In the first step 1310, a first DTC is coupled between the coupler port of a tunable RF equalizer and ground. In a second step 1320, a second DTC is coupled between the isolation port of a tunable RF equalizer and ground.

Figure 14:
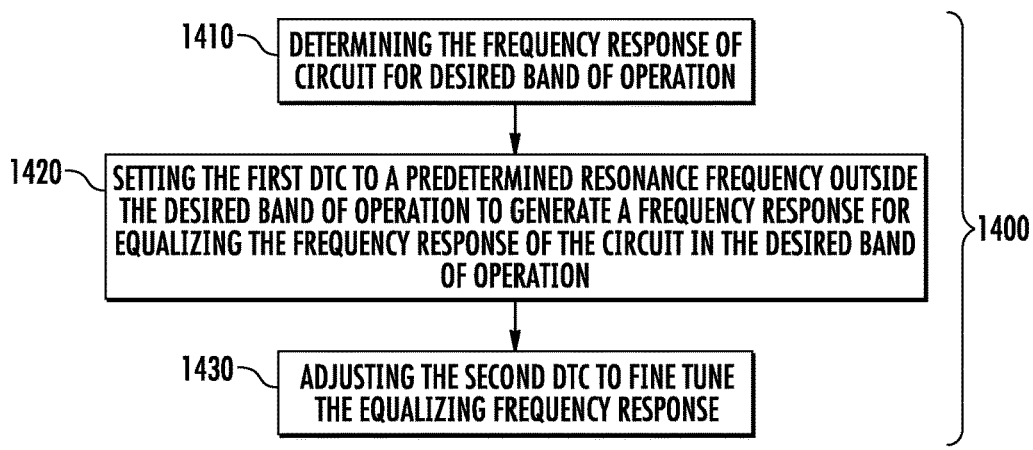
FIG. 14 is a flow chart providing an exemplary method for equalizing frequency response of a data signal.

FIG. 14 is a flowchart that provides an exemplary method 1400 for equalizing the frequency response of circuit. The exemplary method 1400 for equalizing the frequency response of circuit begins with the first step 1410. In the first step 1410, the desired band of frequencies for operation of the circuit is ascertained and the frequency response over the band of frequencies is determined. In a second step 1420, the first DTC is set to a predetermined resonance frequency that is outside the desired band of operation. The first DTC then generates a frequency response for equalizing the frequency response of the circuit in the desired band of operation. In a third step 1430, the second DTC is adjusted to fine tune the frequency response of the equalizing signal.

Some examples of components that are suited for use in the tunable RF equalizer 430 include the DC1722J5015AHF ultralow profile 0805 15 dB directional coupler (which may be used as the coupler 431). The DC1722J5015AHF is available from ANAREN Inc. of East Syracuse, N.Y. The DC1722J5015AHF is a low cost, low profile sub-miniature high performance 15 dB directional coupler in an easy to use RoHS compliant, halogen free surface mount package. It is designed for 1700-2200 MHz applications including: WCDMA, CDMA, GSM1800/1900 and UMTS applications. The DC1722J5015AHF is ideal for power detection, signal injection and other applications where low insertion loss signal monitoring is required.

Some examples of components that are suited for use in the tunable radiofrequency (RF) equalizer 430 include the PE64906 and PE64907 UltraCMOS® Digitally Tunable Capacitors (DTC) 100-3000 MHz (which may be used as either one or both of the coarse tunable capacitor 436 and the fine tunable capacitor 432). The PE64906 and PE64907 are available from Peregrine Semiconductor Corporation of San Diego, Calif. Features include 3-wire (SPI compatible) serial interface with built-in bias voltage generation and ESD protection; proprietary technology enhancements; 5-bit 32-state Digitally Tunable Capacitor; shunt configuration C=0.9 pF to 4.6 pF (5.1:1 tuning ratio) in discrete 119 pF steps; high RF power handling (30 Vpk RF) and linearity; a wide power supply range (2.3V to 4.8V) and low current consumption (about 140 μA at 2.75V); as well as high tolerance of 2 kV HBM ESD on all pins.

The terminology "equalize," "equalization," and other similar terms can include adjusting signal strength to a desired level. Other similar terminology may include "calibrate," "adjust" and the like. Generally, and by way of more specific examples, "equalization" refers to adjustment of frequency response over a selected band of frequencies, while terms such as "calibration" refer to equalizing a signal to a standard for a desired parameter. Generally, the equalization process provides for reductions in "ripple" or variations in power for frequencies within a selected band of frequencies.

As provided herein, and in signal processing, a band-stop filter or band-rejection filter is a filter that passes most frequencies unaltered, but attenuates those in a specific range to very low levels. It is the opposite of a band-pass filter. A notch filter is a band-stop filter with a narrow stopband (that is, exhibits a high quality factor, Q).

One of the DTCs is a coarse DTC and the other one of the DTCs is a fine DTC.

The coupler may be a directional coupler. Each of the first DTC and the second DTC may be controlled by a digital SPI bus. Limiting flow of the current across the capacitor may affect the quality factor (Q) of the frequency resonance of the first DTC and the resistor. A lower resistance of the resistor may reduce the amount of the equalizer correction in a given frequency range and a higher resistance may increase the amount of the equalizer correction in a given frequency range. The coarse DTC may provide wide tuning equalization and the fine DTC may provide narrow tuning equalization. A plurality of RF equalizers may be arranged with each one of the plurality of RF equalizers connected to another one of the plurality in a cascade configuration.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An equalizing system, comprising:
   a wireless communication system for receiving at least one service, the wireless communication system comprising a plurality of optical fiber cables and a plurality of remote units connected by the optical fiber cables, the plurality of remote units being distributed over a deployment site, at least one service being routed to the plurality of remote units; and
   a RF equalizer comprising:
      a coupler comprising an input port, an output port, a coupling port, and an isolation port; and
      a combination circuit, comprising:
         a coupling node electrically coupled to the coupling port;
         a first digitally tunable capacitor (DTC) connected between the coupling node and ground;
         a resistor connected between the coupling node and ground that controls a quality factor of resonance;
         an isolation node coupled to the isolation port; and
         a second DTC, wherein
            one of the first DTC and the second DTC is configured as a coarse DTC and the other one of the first DTC and the second DTC is configured as a fine DTC.

2. The equalizing system of claim 1, wherein the coarse DTC provides wide tuning equalization and the fine DTC provides narrow tuning equalization.

3. The equalizing system of claim 2, wherein the coupler is a directional coupler.

4. The equalizing system of claim 2, wherein each of the first DTC and the second DTC is controlled by a digital serial peripheral interface bus.

5. The equalizing system of claim 1, wherein limiting flow of current across the first DTC affects the quality factor of the resonance of the first DTC and the resistor.

6. The equalizing system of claim 5, wherein a lower resistance of the resistor reduces an amount of equalizer correction in a given frequency range and a higher resistance increases an amount of the equalizer correction in a given frequency range.

7. The equalizing system of claim 1, further comprising a second coupler comprising a second input port coupled to the input port, a second output port, a second coupling port, and a second isolation port.

8. The equalizing system of claim 7, further comprising a second combination circuit, comprising:
   a second coupling node electrically coupled to the second coupling port;
   a third DTC connected between the second coupling node and ground;
   a second resistor connected between the second coupling node and the ground for controlling a quality factor of a second resonance;
   a second isolation node coupled to the second isolation port; and
   a fourth DTC connected between the second isolation node and the ground.

9. An equalizing system, comprising:
   a wireless communication system for receiving at least one service from at least one source, the wireless communication system comprising:
      a head end unit;
      a plurality of optical fiber cables; and
      a plurality of remote units connected to the head end unit by the optical fiber cables, the plurality of remote units being distributed over a deployment site, the head end unit being configured for routing the at least one service to the plurality of remote units; and
   a RF equalizer comprising:
      a coupler comprising an input port, an output port, a coupling port, and an isolation port; and
      a combination circuit, comprising:
         a coupling node electrically coupled to the coupling port;
         a first DTC connected between the coupling node and ground;
         a resistor connected between the coupling node and ground that controls a quality factor of resonance;
         an isolation node; and
         a second DTC connected between the isolation node and ground.

10. The equalizing system of claim 9, wherein the remote units are deployed over multiple floors at the deployment site.

11. The equalizing system of claim 10, wherein one of the first DTC and the second DTC is configured as a coarse DTC and the other one of the first DTC and the second DTC is configured as a fine DTC.

12. The equalizing system of claim 11, wherein the coarse DTC provides wide tuning equalization and the fine DTC provides narrow tuning equalization.

13. The equalizing system of claim 11, wherein each of the first DTC and the second DTC is controlled by a digital serial peripheral interface bus.

14. The equalizing system of claim 11, wherein limiting flow of current across the first DTC affects the quality factor of the resonance of the first DTC and the resistor.

15. The equalizing system of claim 14, wherein a lower resistance of the resistor reduces an amount of equalizer correction in a given frequency range and a higher resistance increases an amount of the equalizer correction in a given frequency range.

16. The equalizing system of claim 10, further comprising:
- a second coupler comprising a second input port coupled to the input port, a second output port, a second coupling port, and a second isolation port;
- a second combination circuit, comprising:
  - a second coupling node electrically coupled to the second coupling port;
  - a third DTC connected between the second coupling node and ground;
  - a second resistor connected between the second coupling node and the ground for controlling a quality factor of a second resonance;
  - a second isolation node coupled to the second isolation port; and
  - a fourth DTC connected between the second isolation node and the ground.

17. An equalizing system, comprising:
- a wireless communication system for receiving at least one service from at least one source, the wireless communication system comprising:
  - a head end unit;
  - a plurality of optical fiber cables; and
  - a plurality of remote units connected to the head end unit by the optical fiber cables, the head end unit being configured for routing the at least one service to the plurality of remote units; and
- a RF equalizer disposed in at least one of the head end unit and one of the plurality of remote units, the RF equalizer comprising:
  - a coupler comprising an input port, an output port, a coupling port, and an isolation port; and
  - a combination circuit, comprising:
    - a coupling node electrically coupled to the coupling port;
    - a first DTC connected to the coupling node and ground;
    - a resistor connected between the coupling node and ground that controls a quality factor of resonance;
    - an isolation node coupled to the isolation port; and
    - a second DTC coupled to the isolation node and ground.

18. The equalizing system of claim 17, wherein:
limiting flow of current across the first DTC affects the quality factor of the resonance of the first DTC and the resistor; and
a lower resistance of the resistor reduces an amount of equalizer correction in a given frequency range and a higher resistance increases an amount of the equalizer correction in a given frequency range.

19. The equalizing system of claim 17, further comprising:
- a second coupler comprising a second input port coupled to the input port, a second output port, a second coupling port, and a second isolation port;
- a second combination circuit, comprising:
  - a second coupling node electrically coupled to the second coupling port; and
  - a third DTC connected between the second coupling node and ground.

* * * * *